United States Patent
Thoreson et al.

(10) Patent No.: US 11,820,897 B2
(45) Date of Patent: Nov. 21, 2023

(54) VAPOR MITIGATION BARRIERS

(71) Applicant: REGENESIS BIOREMEDIATION PRODUCTS, San Clemente, CA (US)

(72) Inventors: Kristen A. Thoreson, San Clemente, CA (US); Hieu Nguyen, San Clemente, CA (US); Scott B. Wilson, San Clemente, CA (US)

(73) Assignee: REGENESIS BIOREMEDIATION PRODUCTS, San Clemente, CA (US)

( * ) Notice: Subject to any disclaimer, the term of this patent is extended or adjusted under 35 U.S.C. 154(b) by 1260 days.

(21) Appl. No.: 15/977,749

(22) Filed: May 11, 2018

(65) Prior Publication Data

US 2018/0327600 A1    Nov. 15, 2018

Related U.S. Application Data

(60) Provisional application No. 62/568,193, filed on Oct. 4, 2017, provisional application No. 62/505,330, filed on May 12, 2017.

(51) Int. Cl.
    *C08L 95/00*     (2006.01)
    *C08L 9/04*      (2006.01)
    *C08L 15/02*     (2006.01)

(52) U.S. Cl.
    CPC .............. *C08L 95/005* (2013.01); *C08L 9/04* (2013.01); *C08L 15/02* (2013.01); *C08L 2201/14* (2013.01); *C08L 2201/52* (2013.01)

(58) Field of Classification Search
    CPC .............................. C08L 95/00; C08L 95/005
    See application file for complete search history.

(56) References Cited

U.S. PATENT DOCUMENTS

| | | | | |
|---|---|---|---|---|
| 2,509,777 A | * | 5/1950 | Mcmillan | C08L 33/20 524/60 |
| 2,550,371 A | * | 4/1951 | Naps | C08L 95/005 516/41 |

(Continued)

FOREIGN PATENT DOCUMENTS

| WO | 9849106 | 11/1998 |
|---|---|---|
| WO | WO2015123569 | 8/2015 |

OTHER PUBLICATIONS

Transportation Research Board Circular E-C102 Asphalt Emulsion Technology Aug. 2006 https://onlinepubs.trb.org/onlinepubs/circulars/ec102.pdf (Year: 2006).*

(Continued)

*Primary Examiner* — Alexandra M Moore
(74) *Attorney, Agent, or Firm* — STETINA BRUNDA GARRED & BRUCKER

(57) ABSTRACT

Compositions for forming an improved vapor mitigation barrier are contemplated, such compositions being formed as an aqueous mixture of an asphalt component and a latex component, with the latex component including a chemically resistant latex, the chemically resistant latex being an acrylonitrile butadiene copolymer, an elastomeric fluoropolymer, or both. Such compositions, when cured and formed into a vapor mitigation barrier, may be seen to substantially mitigate diffusion of chlorinated hydrocarbons across the barriers. Also contemplated are methods for forming such vapor mitigation barriers, as well as vapor mitigation barrier products formed via the application of such compositions to various substrates.

20 Claims, 1 Drawing Sheet

(56) References Cited

U.S. PATENT DOCUMENTS

| | | | |
|---|---|---|---|
| 3,286,475 | A | 11/1966 | Adams |
| 3,785,852 | A | 1/1974 | Schleidt |
| 4,033,894 | A | 7/1977 | McLaughlin et al. |
| 4,168,924 | A | 9/1979 | Draper et al. |
| 4,211,822 | A | 7/1980 | Kurfman et al. |
| 4,504,528 | A * | 3/1985 | Zucker .................. C04B 41/009 427/388.2 |
| 4,664,809 | A | 5/1987 | Fenton et al. |
| 5,006,250 | A | 4/1991 | Roberts et al. |
| 5,091,447 | A * | 2/1992 | Lomasney ................ B09B 3/00 525/122 |
| 5,217,616 | A | 6/1993 | Sanyal et al. |
| 5,266,213 | A | 11/1993 | Gillham |
| 5,395,419 | A | 3/1995 | Farone et al. |
| 5,514,279 | A | 5/1996 | Blowes et al. |
| 5,580,770 | A | 12/1996 | DeFilippi |
| 5,591,118 | A | 1/1997 | Bierck |
| 6,592,294 | B1 | 7/2003 | Moore |
| 6,596,190 | B1 | 7/2003 | Igawa et al. |
| 6,806,078 | B2 | 10/2004 | Newman |
| 7,101,115 | B2 | 9/2006 | Luthy et al. |
| 7,160,471 | B2 | 1/2007 | Looney et al. |
| 7,395,863 | B2 | 7/2008 | Wang et al. |
| 7,585,132 | B2 | 9/2009 | Imbrie |
| 7,845,883 | B1 | 12/2010 | Siler, III et al. |
| 7,963,720 | B2 | 6/2011 | Hoag et al. |
| 7,985,460 | B2 | 7/2011 | Polk |
| 8,748,331 | B2 | 6/2014 | Talley et al. |
| 8,940,830 | B2 * | 1/2015 | Knight ................ C09D 195/005 427/136 |
| 8,986,545 | B2 | 3/2015 | Kolhatkar |
| 2003/0047507 | A1 | 3/2003 | Hou et al. |
| 2004/0031223 | A1 | 2/2004 | Durning et al. |
| 2004/0195182 | A1 | 10/2004 | Elliott |
| 2004/0249025 | A1 | 12/2004 | Dean |
| 2005/0263460 | A1 | 12/2005 | Farone et al. |
| 2005/0282390 | A1 | 12/2005 | Bian et al. |
| 2006/0054570 | A1 | 3/2006 | Block et al. |
| 2006/0088498 | A1 | 4/2006 | Martin et al. |
| 2006/0196850 | A1 | 9/2006 | Roh et al. |
| 2007/0297858 | A1 | 12/2007 | Imbrie |
| 2008/0008535 | A1 | 1/2008 | Ball |
| 2008/0028978 | A1 * | 2/2008 | Twining ............... G10K 11/162 252/62 |
| 2008/0125334 | A1 | 5/2008 | Burns et al. |
| 2008/0176943 | A1 | 7/2008 | Kaiser et al. |
| 2009/0197042 | A1 * | 8/2009 | Polk ........................ E02D 31/02 427/407.1 |
| 2013/0058724 | A1 | 3/2013 | John et al. |
| 2015/0034559 | A1 | 2/2015 | Mork et al. |
| 2016/0340552 | A1 * | 11/2016 | O'Connell .............. C04B 26/26 |

OTHER PUBLICATIONS

Mackenzie et al., "Carbo-Iron an Fe/AC composite as alternative to nano-iron for groundwater treatment", Water Res.; Aug. 2012, vol. 46 (12); pp. 3817-3826; (retrieved from Internet: (http:www///.sciencedirect.com/science/article/pii/S0043135412002552#), pp. 38'9, col. 2. para 2; p. 3820, col. 1, para 4; p. 3822, col. 2, para 2-3; abstract.

Committee On Future Options for Management in the Nation's Subsurface Remediation Effort et al.; Prepublication Alternatives for Managing the Nation's Complex Contaminated Groundwater Sites; 2012; 339 pages; National Academy of Sciences; The National Academies Press; Washington, D.C.; US.

Young, Lee W.; International Search Report; PCT/US 15/15899; dated Jan. 15, 2015; 8 pages.

Young, Lee W.; International Search Report; PCT/US 14/494,468; dated Aug. 2, 2013; 9 pages.

Copenheaver, Blaine R.; International Search Report; PCT/US2011/058388; dated Feb. 17, 2012; 6 pages.

Young, Lee W.; International Search Report; PCT/US 18/32145 ; dated Aug. 1, 2018; 10 pages.

Young, Lee W.; International Search Report; PCT/US 18/32392 ; dated Aug. 7, 2018; 10 pages.

Thomas, Shane; International Search Report; PCT/US17/22795; dated Jun. 9, 2017; 15 pages.

Copenheaver, Blaine R.; International Search Report; PCT/US2017/037242; dated Aug. 7, 2017; 13 pages.

Tylac 873 Product Information from Internet Archive, Archived Apr. 9, 2010, Mallard Creek Polymers, http://web.archive.org/web/20100409214427/http://www.mcpolymers.com/products/nitrile/tylac-873.†

\* cited by examiner
† cited by third party

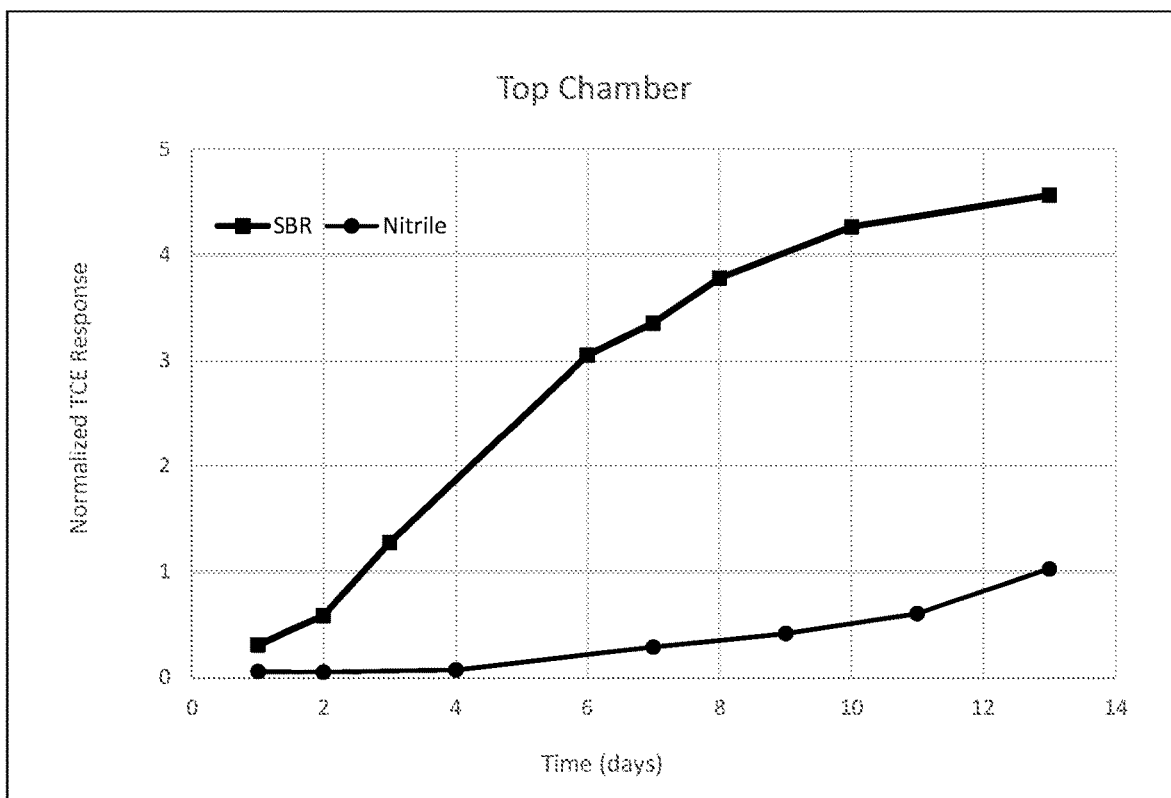

VAPOR MITIGATION BARRIERS

CROSS-REFERENCE TO RELATED APPLICATIONS

This application relates to and claims the benefit of U.S. Provisional Application No. 62/505,330 filed May 12, 2017 and entitled "IMPROVEMENTS TO VAPOR MITIGATION BARRIERS," the entire disclosure of which is hereby wholly incorporated by reference, and this application relates to and claims the benefit of U.S. Provisional Application No. 62/568,193, filed Oct. 4, 2017 and entitled "VAPOR MITIGATION BARRIERS" the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to the field of protective contaminant barriers. More particularly, the present disclosure relates to improved compositions for mitigating diffusion of chlorinated hydrocarbons.

2. Related Art

Contaminant mitigation strategies are used widely in civil engineering and construction to remove or reduce the intrusion of vapor-phase or aqueous/dissolved-phase contaminants that can lead to structural damage or health issues. Historically, water and water vapor were the primary concern which drove the development of moisture barrier or waterproofing technologies which, when properly applied to the building foundation and substructure served to seal the building from water and water vapor intrusion. In more recent times, however, there has been a trend to re-develop former industrial sites, or to construct new buildings on lands that are environmentally impacted. On these sites, chemical contaminants such as petroleum-derived fuels or solvents (e.g. gasoline, diesel, naptha) or chlorinated industrial solvents (e.g. perchloroethylene, trichloroethylene) exist within the subsurface soils or are mixed within groundwater existing on the site. These chemical contaminants can intrude into buildings either as vapors emanating upward through site soils or can enter with water as dissolved constituents.

Typically, contaminant barriers are installed below and/or on the outside of the substructure of the building during the building construction. In most cases, these contaminant barriers consist of a protective membrane sheeting (e.g. low or high density polyethylene, LDPE or HDPE) that functions as the resistive barrier. To improve the constructability and to make a continuous seal between adjacent sheets and around penetrations (e.g. piping, electrical conduits), other layers are added to the protective sheet during installation at the job site. Commonly this includes an asphalt-based layer incorporating a latex rubber to increase flexibility. To date the most common latexes used include polystyrene and polyvinylchloride due to availability and cost. The asphalt layer is often installed in the form of a water-based, latex modified asphalt emulsion that is spray-applied with a catalyst to form a flexible monolithic asphaltic layer.

In these systems where latex modified asphalt layers are employed, the resultant flexible asphalt layer provides additional protection from water and water vapors due to the hydrophobic nature of asphalt. However, it generally does not provide any significant protection from other organic chemicals that are themselves hydrophobic. These hydrophobic chemical contaminants enter into the modified asphalt layer and, over time, permeate the layer resulting in chemical contaminants diffusing completely through the material. This can pose a threat, especially in locations where the sheeting is joined, as in those locations the only continuous barrier may be the latex modified asphalt layer.

Therefore, novel compositions for forming protective contaminant barriers that better mitigate against a broader range of chemical contaminants are desirable.

BRIEF SUMMARY

To solve these and other problems, a composition for mitigating diffusion of chlorinated hydrocarbons is contemplated, the composition comprising from 30-80% by weight of an asphalt component, from 3% to 25% by weight of a latex component, and from 10% to 67% by weight of water, wherein the latex component comprises at least one chemically resistant latex selected from: an acrylonitrile butadiene copolymer, an elastomeric fluoropolymer, or combinations thereof.

According to an exemplary embodiment, the asphalt component may comprise an asphalt having a particle size distribution D90 value of less than 25 microns. The ratio of the asphalt component to the latex component may be from 1:0.05 to 1:0.4. In the latex component, the selected chemically resistant latex may comprise a portion of the total latex component by weight. For example, in certain embodiments, the latex component may comprise at least 5% of the total latex component by weight. In other embodiments, the latex component may comprise at least 25% of the total latex component by weight. In further, embodiments, the latex component may comprise at least 50% of the total latex component by weight. The asphalt component may comprise asphaltic bitumens, or may comprise asphaltenes. The latex component may also comprise a mixture of at least one chemically resistant latex and at least one other latex.

For latex components where the chemically resistant latex is one or more elastomeric fluoropolymers, those elastomeric fluoropolymers may be comprised of one or more monomeric subunits selected from: hexafluoropropylene (HFP), vinyl fluoride (VF), vinylidene fluoride (VDF), tetrafluoroethylene (TFE), perfluoromethylvinylether (PMVE), perfluoropropylvinylether (PPVE), perfluorocycloalkene (PFCA), perfluorocyclohexene (PFCH). The elastomeric fluoropolymer may also be one or more of: a copolymer, a regularly alternating copolymer, a block copolymer, a statistical copolymer, or a branched copolymer.

Methods for creating barriers for mitigating diffusion of chlorinated hydrocarbons are also contemplated. Such a method may comprise the steps of (1) applying to a substrate a composition comprising from 30-80% by weight of an asphalt component, from 3% to 25% by weight of a latex component, and from 10% to 67% by weight of water, wherein the latex component comprises at least one chemically resistant latex selected from: an acrylonitrile butadiene copolymer, an elastomeric fluoropolymer, or combinations thereof, and (2) allowing the composition to cure.

According to certain embodiments of such methods, the compositions may be applied to the substrate to form a continuous layer. The continuous layer may, in certain embodiments, have a thickness of between 0.02 inches to 0.1 inches. The composition may be applied to the substrate via spraying. Where the composition is an emulsion, the composition may further comprise a catalyst for breaking the emulsion.

Barriers for mitigating diffusion of chlorinated hydrocarbons are also contemplated. Such barriers may comprise a substrate and a cured composition applied to the substrate, the composition comprising from 30-80% by weight of an asphalt component, from 3% to 25% by weight of a latex component, and from 10% to 67% by weight of water, wherein the latex component comprises at least one chemically resistant latex selected from: an acrylonitrile butadiene copolymer, an elastomeric fluoropolymer, or combinations thereof.

The cured composition may form a continuous layer on the substrate. Such a continuous layer may be, according to certain embodiments, between 0.02 and 0.1 inches in thickness. The substrate may comprise one or more of low-density polyethelene (LDPE), high-density polyethelene (HDPE), a metal, a geotextile, or combinations thereof.

Methods for mitigating diffusion of chlorinated hydrocarbon contaminants from a source of contamination having either an aqueous or vapor phase to an area to be protected in proximity to the source of contamination, with such methods comprising applying, to a surface between the source of contamination and the area to be protected, a composition comprising from 30-80% by weight of an asphalt component, from 3% to 25% by weight of a latex component, and from 10% to 67% by weight of water, wherein the latex component comprises at least one chemically resistant latex selected from: an acrylonitrile butadiene copolymer, an elastomeric fluoropolymer, or combinations thereof, and allowing the composition to cure.

BRIEF DESCRIPTION OF THE DRAWINGS

FIG. 1 is a graph showing a comparison of the extent of trichloroethelene (TCE) vapor intrusion across a barrier formed of the composition of the exemplary embodiment formed of an asphalt/acrylonitrile butadiene copolymer (Nitrile) barrier, compared to a conventional asphalt/styrene-butadiene copolymer (SBR) barrier.

DETAILED DESCRIPTION

According to various aspects of the present disclosure, new types of compositions for forming improved vapor barriers are contemplated, such compositions being mixtures of an asphalt component and a latex component, with the latex component including at least one chemically resistant latex. The chemically resistant latex may be an acrylonitrile butadiene copolymer, an elastomeric fluoropolymer, or a mixture of both. An aqueous emulsion of the asphalt component and the latex component may be applied to a surface and permitted to cure into an improved vapor barrier. Once cured, such an improved vapor barrier may perform significantly better relative to conventional vapor barriers in terms of resisting intrusion of organic chemicals, especially chlorinated hydrocarbons. In an exemplary embodiment, the composition for forming the improved vapor barrier is an emulsion, by weight, of 50% asphaltic bitumen having a particle size distribution D90 value of less than 25 microns, 9% acrylonitrile butadiene copolymer and 41% water. This exemplary composition may be applied to a surface via spraying (preferably with a catalyst for breaking the emulsion) in order to form a continuous barrier. Once cured for 14 days, such an exemplary composition may be seen to show substantially improved resistance to penetration by chlorinated hydrocarbons relative to conventional vapor barriers. According to other aspects of the present disclosure, the barriers themselves formed from a substrate having such cured compositions applied to them are also contemplated. According to further aspects, methods of forming such barriers from such compositions are also contemplated.

Herein, the term "asphalt" refers to dark brown to black semisolid or solid cementitious hydrocarbon materials which are completely or substantially soluble in carbon disulfide and in which asphaltic bitumens are the sole or predominant constituent. Asphalt occurs in nature or may be obtained by refining petroleum by distillation, precipitation, cracking, oxidation or similar operations. Asphalt suitable for use in the present disclosure include, without limitation, asphaltenes, maltenes, blown asphalt, straight residual oils, distillation residues, still bottoms, cracking residues, asphaltic bitumens, or combinations thereof.

One characteristics of asphalt is its particle size distribution. Particle size distributions are commonly measured via particle size analysis, an analytical technique in which the distribution of sizes of a solid or liquid particulate material is measured. Techniques for particle size analysis may include sieve analysis, direct optical imaging, and laser diffraction. Data from sieve analysis, the oldest of these techniques, is typically presented in the form of an S-curve of cumulative mass retained on each sieve versus the sieve mesh size.

The most commonly used metric when describing particle size distribution are D-values. D-values can be thought of as the cutoff point for the diameter that divides the sample mass into a specified percentage when the particles are arranged on an ascending mass basis. Thus, the D10, D50, and D90 value are the intercept points on the S-curve for 10%, 50%, and 90% of the cumulative mass respectively. D10 is the diameter size at which 10% of the sample's mass are comprised of particles with a diameter less than this size, D50 is the diameter size at which 50% of the sample's mass are comprised of particles with a diameter less than this size, and D90 is the diameter size at which 90% of the sample's mass are comprised of particles with a diameter less than this size. Because D-values are well-established, more advanced methods of measuring particle size distribution than sieve analysis may also report in D-values.

According to the exemplary embodiment, the asphalt component of the composition for mitigation diffusion of chlorinated hydrocarbons has a D90 value of less than 25 microns, which means that 90% of the mass of the asphalt component is comprised of particles having a diameter (i.e. the largest dimension) of less than 25 microns. However, it may be seen that in other embodiments, the D90 value of the asphalt component may be more or less than 25 microns, and that the selection of an asphalt component having a larger or smaller D90 value may result in a change in the material properties of the final composition and/or cured composition which may affect its material properties in various ways. For example, selection of an asphalt having a different D90 value than in the exemplary embodiment may result in a composition that cures more quickly or less quickly than the exemplary embodiment, or in a more or less physically resilient cured composition, or in a cured composition that is more or less permeable to chlorinated hydrocarbons. It may thus be seen that such variations are within the scope and spirit of the present disclosure, which is not to be limited to merely the exemplary embodiment.

A latex is a stable dispersion (an emulsion) of polymers in an aqueous medium that solidifies by coalescence or coagulation of the polymer particles as the water evaporates. Latexes are naturally found in the form of natural latex rubber, which is a mixture of the polymer cis-1,4-polyisoprolene having a molecular weight between 100,000 to 1,000,000 daltons. Latexes are also manufactured synthetically, generally from petroleum byproducts. The most prevalent synthetic latexes are styrene-butadiene rubbers (SBR) derived from the copolymerization of styrene and 1,3-butadiene. Other common synthetic latexes may include those prepared from isoprene, chloroprene, and/or isobutylene.

According to the present disclosure, it is contemplated that the latex component may comprise any mixture of latexes, providing that the latex component comprises at least one chemically resistant latex. As used herein, a "chemically resistant latex" may be an acrylonitrile butadiene copolymer, an elastomeric fluoropolymer, or combinations thereof. In the exemplary embodiment, the latex component comprises an acrylonitrile butadiene copolymer as the sole latex. However, in other embodiments, it may be seen that the latex component may be comprised of a fluoropolymer as the sole latex, or the acrylonitrile butadiene copolymer and/or the fluoropolymer may be one of multiple latexes used in the latex component, only some of which may be a chemically resistant latex. For example, according to certain embodiments the chemically resistant latex may comprise only 5% of the latex component by weight, and in other embodiments the chemically resistant latex may comprise 25%, 50%, or more of the latex component by weight. It may be seen that selection of a latex component having a certain amount of a chemically resistant latex may result in a composition that cures more quickly or less quickly than the exemplary embodiment, or in a more or less physically resilient cured composition, or in a cured composition that is more or less permeable to chlorinated hydrocarbons. It may thus be seen that such variations are within the scope and spirit of the present disclosure, which is not to be limited to merely the exemplary embodiment.

An acrylonitrile butadiene copolymer, also known as nitrile rubber, is a synthetic rubber copolymer of acrylonitrile and butadiene. Acrylonitrile butadiene copolymers are offered for sale under various trade names such as Nipol®, Krynac®, and Europrene®. In certain embodiments the acrylonitrile butadiene copolymer may be, for example but without limitation, a regularly alternating copolymer, a block copolymer, a statistical copolymer, a branched copolymer, or combinations thereof.

Elastomeric fluoropolymers are polymers at least partially based upon monomeric subunits having carbon-fluorine bonds. According to one particular embodiment in which an elastomeric fluoropolymer is used as at least one of the chemically resistant latexes of the latex component, the elastomeric fluoropolymer is a copolymer formed from vinylidene fluoride and hexafluoropropylene, which is offered for sale under the trade name Viton. However, it may be seen that in other embodiments, the elastomeric fluoropolymer may be any polymer that is comprised of one or more monomeric subunits having a carbon-fluorine bond. For example but without limitation, such monomeric subunits may include hexafluoropropylene (HFP), vinyl fluoride (VF), vinylidene fluoride (VDF), tetrafluoroethylene (TFE), perfluoromethylvinylether (PMVE), perfluoropropylvinylether (PPVE), perfluorocycloalkene (PFCA), or perfluorocyclohexene (PFCH). The elastomeric fluoropolymer may be formed of or from a single type of monomeric subunit, or may be formed from multiple types of submits and may be, for example but without limitation, a copolymer, a regularly alternating copolymer, a block copolymer, a statistical copolymer, a branched copolymer, or combinations thereof.

The method of creating a barrier that provides protection against chlorinated hydrocarbon intrusions using the above compositions are described as follows. First a source of chlorinated hydrocarbon contamination is identified in the groundwater, aquifer, vadose zone, or any space that can pose a risk to an area. The concentration of chlorinated hydrocarbons is then quantified to be between 5 micrograms/liter and 50 milligrams/liter in the aqueous phase or 0.5 micrograms/cubic meter to 300 milligrams/cubic meter in the vapor phase. It should be noted that these concentrations may either be currently present or may also be anticipated to be present at a future time, in which case this invention can be used for preemptive risk management.

The composition for mitigation diffusion, when formulated, may comprise emulsion formed from 30%-80% by weight of the asphalt component, from 3% to 25% by weight of the latex component, and from 10% to 67% by weight of water. The ratio of asphalt component to the latex component by weight may be from 1:0.05 to 1:0.4. For example, in the exemplary embodiment, the composition for mitigating diffusion is an emulsion composed of 50% asphalt component, 9% latex component, and 41% water. Other embodiments may have more or less of these components, however, and it may be seen that by using more asphalt component, latex component, or water, the material properties of the composition or of the final cured barrier may be affected in various ways to result in variations, all within the scope and spirit of the present disclosure.

The composition may be applied to a substrate according to known methods of applying compositions to substrates. In the exemplary embodiment, the composition is applied via a two-component spray system further employing a calcium chloride catalyst to break the emulsion formed in the two-component spray system. However, other methods of application may be used, such as spraying via a single spray system, or direct application via a paint brush, a paint roller, or a trowel.

It is contemplated that the composition may be applied to the substrate to form a monolithic layer across the entirety of the substrate with a thickness of between 0.02 inches to 0.1 inches. In the exemplary embodiment, the composition is applied to a constant thickness of 0.07 inches. However, it may be seen that the composition may be applied in multiple layers, or across only a portion of the substrate, or at thicknesses that are more or less thick than the layer of the exemplary embodiment.

Once applied, the composition cures upon the substrate, with the cured composition atop the substrate serving as a superior barrier. In the exemplary embodiment, the composition may fully cure within 14 days of application. However, in other embodiment, it may be seen that that the composition may take more or less time to fully cure.

The substrate may be any material to which the composition may be applied to and cured upon. In the exemplary embodiment, the substrate is a geotextile, which is a permeable fabric that is commonly used in connection with soil for civil engineering application, and may include woven, needle-punch, or bonded fabrics formed from materials such as polypropylene, polyester, or other polymers. However, in other embodiments, it may be seen that other substrates may be utilized, including but not limited to sheets of low density polyethylene (LDPE), high density polyethylene (HDPE), or metal. It may also be seen that, based upon the choice of the substrate and its permeability to vapors, the composition may be applied so as to serve as a barrier through the material of the substrate itself, or around the gaps between various panels of the substrate, or both, and thus it may be desirable in certain configurations of embodiments for the composition to be applied broadly across the substrate(s), or only at select locations at the substrate(s), or more thickly at certain locations and less thickly at others.

It is also contemplated that the substrates to which the herein contemplated compositions may be applied may also include natural or artificial features or surfaces, such as subsoil or topsoil, above or below-ground rock or cement interfaces, or natural or artificially voids into which such composition may be poured or pumped. As such, it may be seen that by applying such compositions between a source of contamination and a location sought to be protected and permitting the compositions to cure, a barrier against aqueous or vapor contaminants may be formed without necessitating the placement of a substrate having such compositions cured upon them prior to placement, but rather the curing may occur in situ.

Turning now to FIG. 1, a graph showing the results of a laboratory experiment conducted with the composition of the exemplary embodiment is shown. In this experiment, the composition of the exemplary embodiment was prepared, by weight, as an emulsion of 50% asphaltic bitumens, 9% acrylonitrile butadiene copolymer, and 41% water. The composition was mixed in a two-component spray system with a calcium chloride solution to break the emulsion, sprayed as a monolithic layer onto a geotextile material to a thickness of 0.07 inches, and permitted to cure for 14 days to form a barrier of the exemplary embodiment. A conventional control barrier was also formed in the same manner, except that a 9% styrene butadiene copolymer was used instead of the acrylonitrile butadiene copolymer.

Each barrier was placed in a two-chamber apparatus, with each chamber separated by the barriers. The bottom chamber of the two-chamber apparatus was partially filled with an aqueous trichloroethylene (TCE) solution, with the vapor concentration of the TCE in the bottom chamber held constant at 700 parts per million by volume. The top chamber was placed under a constant flow rate of 1 mL/min, and the vapor concentration of TCE in the top chamber was monitored for 13 days to measure the extent of TCE vapor intrusion across the barriers.

As may be seen in FIG. 1, the barrier of the exemplary embodiment performed in a far superior manner to the control barrier. The exemplary barrier allowed little or no measurable permeation for at least four days, and when permeation did occur, the rate at which the magnitude of the permeation increased was substantially limited relative to the control barrier. This correlates with both superior vapor protection as well as with superior barrier lifetime.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A method of using a composition for mitigating diffusion of chlorinated hydrocarbon contaminants from a source of contamination having either an aqueous or vapor phase to an area to be protected in proximity to the source of contamination, the method comprising:
   identifying the source of contamination;
   applying, to a surface between the source of contamination and the area to be protected, a composition comprising from 30-80% by weight of an asphalt component, from 3% to 25% by weight of a latex component, and from 10% to 67% by weight of water, the composition being formulated as an emulsion and further incorporating a calcium chloride catalyst for breaking the emulsion, wherein the latex component comprises at least one chemically resistant latex selected from: an acrylonitrile butadiene copolymer, an elastomeric fluoropolymer, or combinations thereof; and
   allowing the composition to cure to form a barrier such that the barrier mitigates the diffusion of the chlorinated hydrocarbon contaminants from the source of contamination to the area to be protected.

2. The method of claim 1, wherein the surface can be selected from the group consisting of: subsoil, topsoil, above-ground rock, below ground rock, or combinations thereof.

3. The method of claim 1, wherein the barrier mitigates the upward emanation of the vapor phase of the source of contamination.

4. A method of using a composition for creating a barrier for mitigating diffusion of chlorinated hydrocarbon contaminants from a source of chlorinated hydrocarbon contamination to an area to be protected, the method comprising the steps of:
   identifying a source of chlorinated hydrocarbon contamination;
   applying to a substrate the composition, the composition comprising from 30-80% by weight of an asphalt component, from 3% to 25% by weight of a latex component, and from 10% to 67% by weight of water, the composition being formulated as an emulsion and further incorporating a calcium chloride catalyst for breaking the emulsion, wherein the latex component comprises at least one chemically resistant latex selected from: an acrylonitrile butadiene copolymer, an elastomeric fluoropolymer, or combinations thereof; and
   allowing the composition to cure to form the barrier
   wherein the substrate is interposed between the source of contamination and the area to be protected to define the barrier; and wherein the barrier is operative to substantially prevent diffusion of the chlorinated hydrocarbon contaminants to the area to be protected.

5. The method of claim 4, wherein the composition is applied to the substrate to form a continuous layer.

6. The method of claim 5, wherein the composition is applied to the substrate to form a continuous layer of between 0.02 inches to 0.1 inches in thickness.

7. The method of claim 4, wherein the composition is applied to the substrate via spraying.

8. The method of claim 4, wherein the asphalt component has a particle size distribution D90 value less than 25 microns.

9. The method of claim 4, The composition of claim 1, wherein the ratio of the asphalt component to the latex component is from 1:0.05 to 1:0.4 by weight.

10. The method of claim 4, wherein in the latex component, the selected chemically resistant latex comprises at least 5% of the latex component by weight.

11. The method of claim 4, wherein the asphalt component comprises asphaltic bitumens, asphaltenes, or combinations thereof.

12. The method of claim 4, wherein the latex component comprises a mixture of at least one chemically resistant latex and at least one other latex.

13. The method of claim 4, wherein in the latex component, the chemically resistant latex comprises one or more elastomeric fluoropolymers, the one or more elastomeric fluoropolymer being comprised of one or more monomeric subunits selected from: hexafluoropropylene (HFP), vinyl fluoride (VF), vinylidene fluoride (VDF), tetrafluoroethylene (TFE), perfluoromethylvinylether (PMVE), perfluoropropylvinylether (PPVE), perfluorocycloalkene (PFCA), perfluorocyclohexane (PFCH).

14. The method of claim 4, wherein the elastomeric fluoropolymer is one or more of: a copolymer, a regularly alternating copolymer, a block copolymer, a statistical copolymer, or a branched copolymer.

15. The method of claim 4, wherein the substrate comprises one or more of: low-density polyethylene (LDPE), high-density polyethylene (HDPE), a metal, a geotextile, or combinations thereof.

16. The method of claim 4, wherein the chlorinated hydrocarbon contaminants exist within subsurface soils or are mixed within groundwater.

17. A method of using a composition to mitigate the diffusion of chlorinated hydrocarbon contaminants from a source of chlorinated hydrocarbon contamination to an area to be protected, the method comprising:
   identifying a source of chlorinated hydrocarbon contamination in groundwater, an aquifer, or a vadose zone;
   applying the composition to a surface between the source of chlorinated hydrocarbon contamination and the area to be protected, the composition comprising from 30-80% by weight of an asphalt component, and 3% to 25% by weight of latex component, and from 10% to 67% by weight of water, the composition being formulated as an emulsion, wherein the latex component comprises at least one chemically resistant latex selected from: an acrylonitrile butadiene copolymer, an elastomeric fluoropolymer, or combinations thereof; and
   allowing the composition to cure to define a cured composition;
   wherein the cured composition substantially mitigates the diffusion of chlorinated hydrocarbons to the area to be protected.

18. The method of claim 4, wherein the source of contamination has either a liquid phase or a vapor phase; and wherein the step of identifying the source of contamination further comprises quantifying the concentration of chlorinated hydrocarbons to be between 5 micrograms per liter to 50 milligrams per liter in the aqueous phase or 0.5 micrograms per cubic meter to 300 milligrams per cubic meter in the vapor phase.

19. The method of claim 1, wherein the step of identifying the source of chlorinated hydrocarbon contamination further comprises quantifying the concentration of chlorinated hydrocarbons to be between 5 micrograms per liter to 50 milligrams per liter in the aqueous phase or 0.5 micrograms per cubic meter to 300 milligrams per cubic meter in the vapor phase.

20. The method of claim 17, wherein the source of chlorinated hydrocarbon contamination has either a liquid phase or a vapor phase; and wherein the step of identifying the source of chlorinated hydrocarbon contamination further comprises quantifying the concentration of chlorinated hydrocarbons to be between 5 micrograms per liter to 50 milligrams per liter in the aqueous phase or 0.5 micrograms per cubic meter to 300 milligrams per cubic meter in the vapor phase.

* * * * *